(12) United States Patent
Li et al.

(10) Patent No.: US 9,888,489 B2
(45) Date of Patent: Feb. 6, 2018

(54) DEVICE-TO-DEVICE COMMUNICATION COLLISION RESOLUTION

(71) Applicant: Telefonaktiebolaget LM Ericsson (publ), Stockholm (SE)

(72) Inventors: Yunxi Li, Järfälla (SE); Qianxi Lu, Beijing (CN); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 15/033,008

(22) PCT Filed: Oct. 30, 2014

(86) PCT No.: PCT/SE2014/051285
§ 371 (c)(1),
(2) Date: Apr. 28, 2016

(87) PCT Pub. No.: WO2015/065281
PCT Pub. Date: May 7, 2015

(65) Prior Publication Data
US 2016/0295603 A1 Oct. 6, 2016

Related U.S. Application Data

(60) Provisional application No. 61/898,683, filed on Nov. 1, 2013.

(51) Int. Cl.
*H04W 72/12* (2009.01)
*H04W 74/08* (2009.01)
(Continued)

(52) U.S. Cl.
CPC ..... *H04W 72/1247* (2013.01); *H04W 28/046* (2013.01); *H04W 74/0858* (2013.01); *H04W 76/023* (2013.01)

(58) Field of Classification Search
None
See application file for complete search history.

(56) References Cited

U.S. PATENT DOCUMENTS

2009/0262711 A1* 10/2009 Ahn ............... H04W 72/14
370/336
2010/0202400 A1* 8/2010 Richardson ........ H04W 8/005
370/330
(Continued)

FOREIGN PATENT DOCUMENTS

WO 2012016378 A1 2/2012
WO 2012160510 A1 11/2012

OTHER PUBLICATIONS

3GPP, "3rd Generation Partnership Project; Technical Specification Group Services and System Aspects; Service requirements for the Evolved Packet System (EPS) (Release 12)", 3GPP TS 22.278 V12.0.0, Dec. 2011, 1-33.
(Continued)

*Primary Examiner* — Hong Cho
(74) *Attorney, Agent, or Firm* — Murphy, Bilak & Homiller, PLLC

(57) ABSTRACT

A first terminal device (100A) transmits scheduling assignments to announce its scheduled data transmissions. A second terminal device (100B), after receiving the scheduling assignment, determines the timing information of the scheduled data transmission from the first terminal device (100A). However, the scheduling assignment transmissions from two terminal devices (100A, 100B) may collide, in which case, the terminal devices (100A, 100B) may fail to receive the scheduling assignment from each other and miss the scheduled data transmissions indicated in the scheduling assignments. The present application discloses how to detect collisions between scheduling assignment transmissions
(Continued)

from two terminal devices (100A, 0B) that are configured for device-to-device communication.

15 Claims, 7 Drawing Sheets

(51) Int. Cl.
*H04W 28/04* (2009.01)
*H04W 76/02* (2009.01)

(56) References Cited

U.S. PATENT DOCUMENTS

| | | | |
|---|---|---|---|
| 2012/0008571 A1 | 1/2012 | Li et al. | |
| 2013/0089036 A1 | 4/2013 | Cho et al. | |
| 2013/0322413 A1* | 12/2013 | Pelletier | H04W 72/1289 370/336 |
| 2014/0219095 A1* | 8/2014 | Lim | H04W 72/085 370/235 |
| 2016/0278045 A1* | 9/2016 | Adachi | H04W 72/04 |

OTHER PUBLICATIONS

3GPP, "3rd Generation Partnership Project; Technical Specification Group Services and System Aspects; Service requirements for the Evolved Packet System (EPS) (Release 12)", 3GPP TS 22.278 V12.1.0, Jun. 2012, 1-34.

3GPP, "3rd Generation Partnership Project; Technical Specification Group Services and System Aspects; Service requirements for the Evolved Packet System (EPS) (Release 12)", 3GPP TS 22.278 V12.6.0, Dec. 2014, 1-42.

3GPP, "3rd Generation Partnership Project; Technical Specification Group Services and System Aspects; Service requirements for the Evolved Packet System (EPS) (Release 12)", 3GPP TS 22.278 V12.7.0, Dec. 2015, 1-42.

3GPP, "3rd Generation Partnership Project; Technical Specification Group Services and System Aspects; Service requirements for the Evolved Packet System (EPS) (Release 12)", 3GPP TS 22.278 V12.2.0, Mar. 2013, 1-42.

3GPP, "3rd Generation Partnership Project; Technical Specification Group Services and System Aspects; Service requirements for the Evolved Packet System (EPS) (Release 12)", 3GPP TS 22.278 V12.5.0, Sep. 2014, 1-42.

3GPP, "3rd Generation Partnership Project; Technical Specification Group Services and System Aspects; Service requirements for the Evolved Packet System (EPS) (Release 12)", 3GPP TS 22.278 V12.3.0, Jun. 2013, 1-45.

3GPP, "3rd Generation Partnership Project; Technical Specification Group Services and System Aspects; Service requirements for the Evolved Packet System (EPS) (Release 12)", 3GPP TS 22.278 V12.4.0, Sep. 2013, 1-45.

* cited by examiner

DEVICE-TO-DEVICE COMMUNICATION COLLISION RESOLUTION

TECHNICAL FIELD

The present application relates generally to device-to-device communication, and more specifically, to collision resolution in device-to-device communication.

BACKGROUND

Device-to-device (D2D) communication between terminal devices in a cellular network relies on the close proximity of terminal devices that are oftentimes close to each other. D2D communication allows terminals devices to operate in a controlled interference environment. Typically, D2D communication shares the same spectrum as the cellular system. For example, some of the cellular uplink resources may be reserved for D2D communication. The other option, i.e., allocating dedicated spectrum resources for D2D communication purposes, is a less attractive alternative because allocating dedicated spectrum resources to D2D communication is undesirable is that spectrum resources are scarce and should be shared when it is practical to do so. Another reason is that dynamic sharing spectrum resources between D2D communication services and cellular services provides more flexibility and improves spectrum efficiency. When spectrum resources are shared between a cellular network and a D2D communication network, the terminal devices in the D2D communication network and the cellular network are aware of each other's uplink subframe timing and can avoid overlapping transmissions on the same uplink resource.

A D2D communication network is also known as an ad hoc network and a D2D terminal device is also known as Proximity Based-Services (ProSe) enabled terminal device. In general, an ad hoc network does not include a central controller. Although only introduced into 3GPP standards recently, ad hoc networks are well-studied and have been deployed in IEEE 802.11 WLAN systems.

In a D2D terminal device, there is the so-called "half-duplex constraint." That is, a terminal device cannot send and receive D2D communication signals simultaneously. As a result, if two terminal devices in close proximity transmit simultaneously, there is a collision between the transmissions from the two terminal devices. "Collision" in the present application refers to the scenario in which two or more transmitting devices in close proximity are transmitting simultaneously and, as a result, no transmitted signal is received by any of the transmitting devices due to the "half-duplex constraint." When a collision between two transmitting terminal devices happens, neither terminal device receives the data transmitted by the other terminal device.

The present application discloses advanced methods and apparatus that can be used to resolve collisions between transmissions from D2D terminal devices without relying on a central controller.

SUMMARY

The present application relates to detecting scheduling assignment (SA) transmission collisions between two terminal devices and resolving the detected collisions.

In some embodiments, a first terminal device is configured to communicate with other terminal devices. The first terminal device transmits scheduling assignments (SAs) in one or more transmitting opportunities. The first terminal device detects whether there is a collision between its SA transmissions and a SA transmission from another terminal device. If there is a collision, the first terminal device selectively adjusts its transmissions of SAs in order to receive a SA from the other terminal device.

In some embodiments, the first terminal device detects a SA transmission collision with another terminal device by randomly selecting a transmitting opportunity to mute its own SA transmission. The first terminal device determines that there is a SA transmission collision when the first terminal device receives a SA from another terminal device during muting. If there is a SA transmission collision, the first terminal device selectively adjusts its SA transmissions in order to receive a SA from the other terminal device.

In some embodiments, the first terminal device detects a SA transmission collision with another terminal device by receiving a user data transmission from the other terminal device and by determining, based on the received user data transmission, when the other terminal device will transmit a SA. By comparing the SA transmission timing of the other terminal device with its own SA transmission schedule, the first terminal device can detect a SA transmission collision between itself and the other terminal device.

In some embodiments, an exemplary terminal device configured to detect SA transmission collisions with other terminal devices comprises a transceiver and a processor. The transceiver is configured to transmit SAs in one or more transmitting opportunities. The processor is configured to detect whether there is a collision between the SA transmissions by the terminal device and a SA transmission from another terminal device. The processor is also configured to selectively adjust the SA transmissions by the terminal device in order to receive a SA from the other terminal device.

In some embodiments, more than two terminal devices may be involved in a SA transmission collision. The methods and techniques disclosed herein can be used to detect and resolve SA transmission collisions among a plurality of terminal devices.

DETAILED DESCRIPTION

Figure 1:
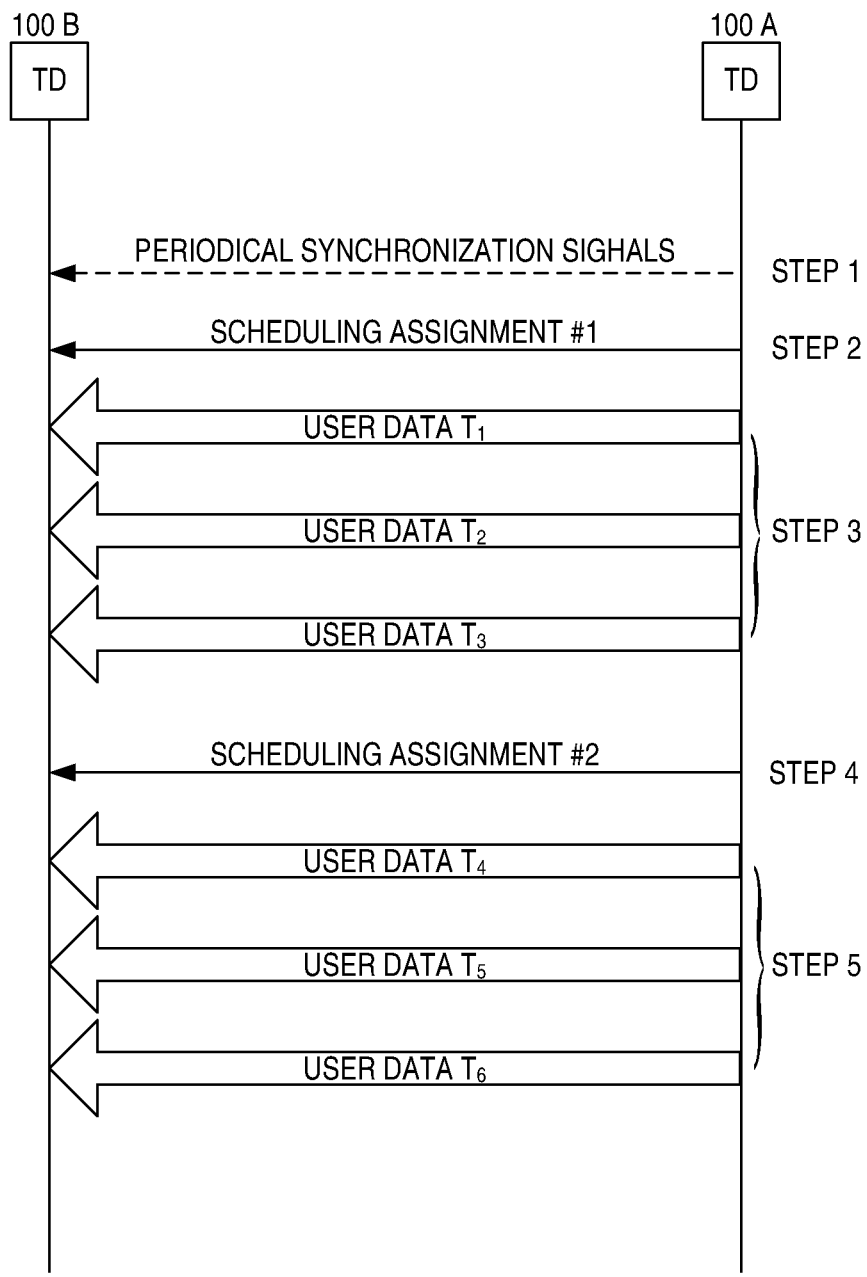
FIG. 1 is illustrates an exemplary data transmission process between two D2D terminal devices.

FIG. 1 illustrates an exemplary data transmission process between two terminal devices, the terminal device 100A and the terminal device 100B. In all figures, terminal device is abbreviated as TD. The two terminal devices 100A and 100B engage in D2D communication. In the present application, examples of D2D communication include broadcast transmissions, unicast transmissions, multicast transmissions, or other types of communication between two or more terminal devices. Also in the present application, the term terminal device is used to refer to mobile terminals, mobile devices, user equipment, user devices, or any other types of wireless devices that are capable of communicating with a network node and/or another wireless device using radio signals. A terminal device may also refer to any of the following: a radio communication device, target device, device to device User Equipment (UE), machine type device, a UE capable of machine to machine communication, a sensor equipped with UE, iPAD, tablet, mobile terminal, smart phone, laptop embedded equipment (LEE), laptop mounted equipment (LME), USB dongles, Customer Premises Equipment (CPE), etc. The techniques and methods disclosed herein are equally applicable to any type of the wireless devices mentioned above and equivalents thereof.

In FIG. 1, the terminal device 100A transmits a synchronization signal periodically (Step 1 in FIG. 1). The synchronization signal carries information related to SA transmissions by the terminal device 100. For example, the synchronization signal may carry the time/frequency synchronization reference and the resource pool used by the terminal device 100A for SA transmissions. When the terminal device 100A intends to transmit D2D user data, it first transmits a scheduling assignment (SA) #1 to one or more D2D terminal devices, for example, the terminal device 100B. See Step 2 in FIG. 1. The SA #1 contains information about the resources (frequency resource and/or time resource) that will be used to carry user data. For example, in FIG. 1, the SA #1 may indicate three time slots, T1, T2, and T3, which are scheduled for user data transmission by the terminal device 100. After transmitting the SA #1, the terminal device 100A transmits D2D user data using the three time slots specified in the SA (Step 3 in FIG. 1). To transmit more user data, the terminal device 100A transmits another SA, SA #2, which specifies three times slots, T4, T5, and T6, for scheduled user data transmissions. See Step 4 in FIG. 1. At each of the three time slots, the terminal device 100A transmits user data as scheduled. See Step 5 in FIG. 1.

The existing solution to collision resolution in a cellular or an ad hoc network can be summarized as follows. In a cellular network, a central controller like an eNB receives and grants requests of resources from the terminal devices located within the coverage area of the eNB. The central controller is aware of the resource usage of each terminal device within its coverage. The central controller can resolve collisions easily by coordinating the transmissions from all the terminal devices. However, for D2D, when a D2D terminal device is outside of the coverage area of a cellular network, there is no central controller available for scheduling and coordination. The terminal device cannot rely on central scheduling.

The terminal devices can avoid collisions in an autonomous manner, e.g., using a Carrier Sense Multiple Access with Collision Avoidance (CSMA/CA) approach. However, the existing CSMA/CA scheme does not work for D2D terminal devices that do not send ACK or NACK feedback. In the CSMA/CA scheme, feedback from the receiving terminal device is required for collision detection. If no ACK is received from the receiving terminal device by the transmitting terminal device, the transmitting terminal device interprets the absence of an ACK as indication of a collision with the receiving terminal device. However, in D2D communication, receiving terminal devices do not send feedback and the CSMA/CA approach cannot be adopted in D2D communication. Even when the D2D terminals are located inside the coverage area of a cellular network where a central controller, e.g., a base station or eNB, is available for central scheduling, an alternative without central controlling or scheduling is desirable in order to reduce the burden on the base station or eNB, especially when there are a large number of D2D terminal devices. It is also desirable to have a common solution for terminal devices that are located inside and outside the coverage area of a cellular network so that D2D terminal devices may move in or out of a cellular network without experiencing disruptions in D2D communication services.

The present application discloses advanced methods and apparatus that can be used to resolve collisions between transmissions from D2D terminal devices without relying on a central controller or ACK/NACK feedback. The present application discloses several methods and techniques that can be used by D2D terminal devices to detect SA transmission collisions. The collision detection methods disclosed herein can be used by D2D terminal devices in a broadcast communication system in which receiving devices do not necessarily send ACK/NACK regarding whether the data are properly received or not. The solutions disclosed herein can also be used in multicast or unicast communication systems.

In an exemplary D2D communication system, when a first terminal device, terminal device 100A, receives an SA from a second terminal device, terminal device 100B, the terminal device 100A can obtain the scheduling information about the user data transmission from the terminal device 100B based on the received SA. The terminal device 100A determines whether there will be a collision between the user data transmission from the terminal device 100B and its own user data transmission. However, the terminal device 100A cannot receive an SA from the terminal device 100B if there is a collision between the SA transmissions of these two terminal devices (i.e., both terminal devices 100A and 100B transmit simultaneously). Consequently, the capability of detecting and avoiding SA collisions between D2D terminal devices are required for D2D terminal devices to engage in reliable user data transmission and reception.

Figure 2:
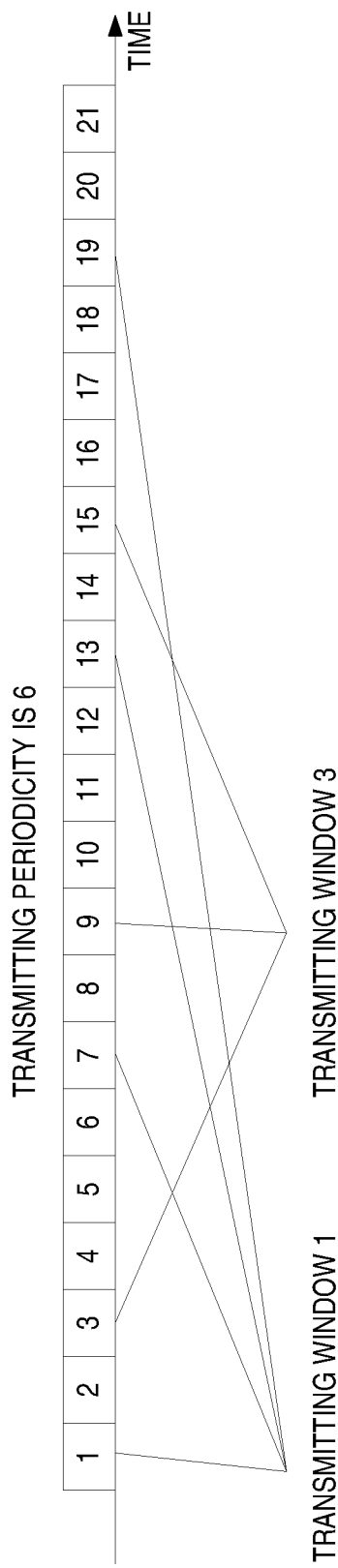
FIG. 2 illustrates exemplary SA transmission opportunities.

In an exemplary D2D communication system, each terminal device transmits SAs periodically with the same periodicity. Transmitting opportunities for SA transmissions can be grouped into different transmitting windows as show in FIG. 2. In the present application, a transmitting window simply refers to a group of transmitting opportunities. FIG. 2 shows various transmission opportunities, e.g., time slots available to terminal devices in a D2D communication system. As an example, FIG. 2 shows a transmission periodicity of 6 time slots. That is, a terminal device 100A or 100B transmits an SA every 6 time slots. If a terminal device transmits an SA in time slot #1, it will transmit again in time slot #7, #13, #19, etc., until there is no need for the terminal device to continue transmitting SAs, for example, there isn't any user data to transmit. These time slots (#1, #7, #13, and #19) form a transmit window 1. FIG. 2 also depicts another transmit window, transmit window 3, which comprises time slot #3, #9, and #15, etc.

Because all terminals in a D2D communication system use the same SA transmitting periodicity, for a particular terminal device, all of its SAs will be transmitted in time slots belonging to the same transmitting window, e.g., transmitting window 1. There will be collisions between SA transmissions of two terminal devices when and only when the two terminal devices are using the same transmitting window to transmit SAs.

Figure 3:
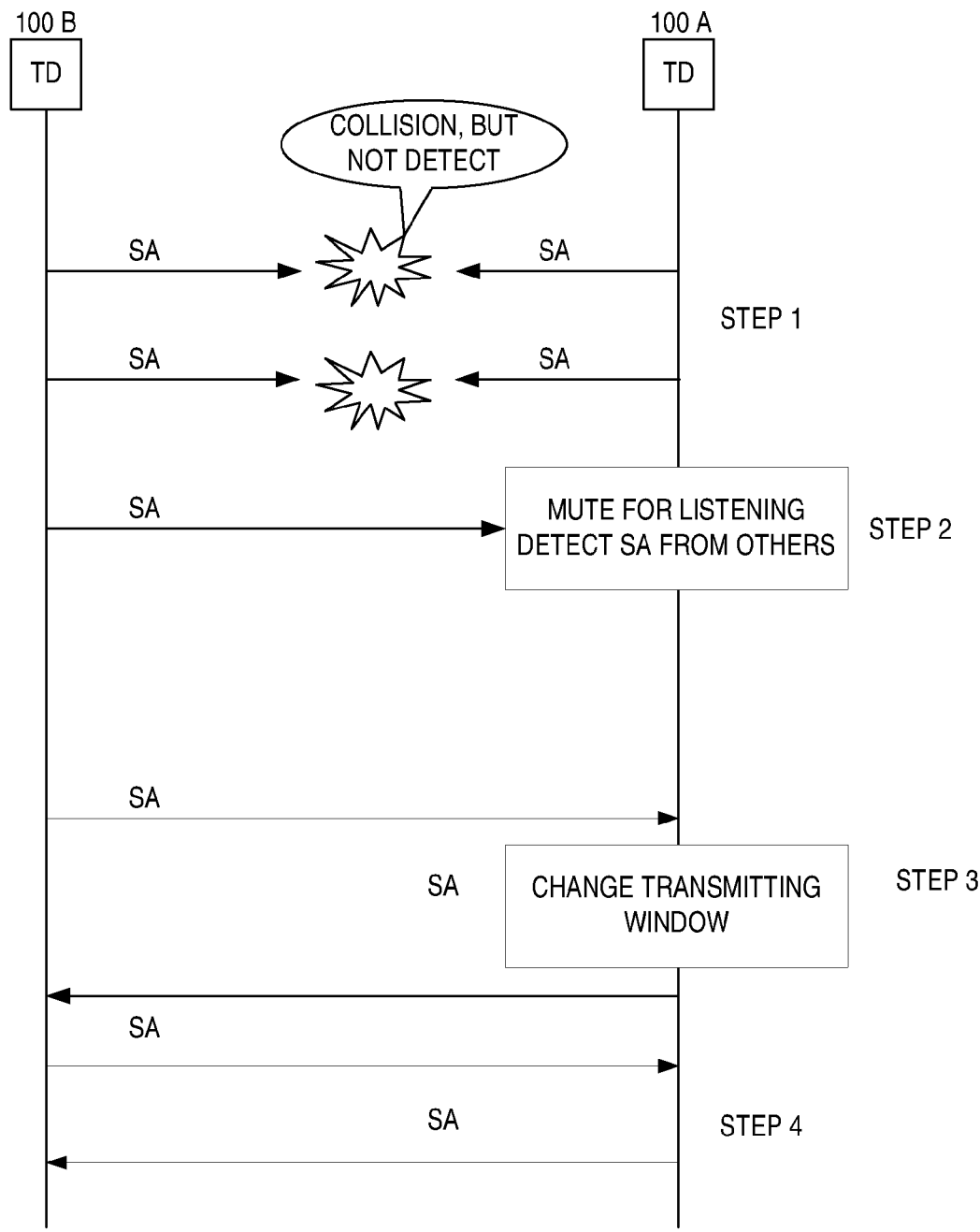
FIG. 3 illustrates an exemplary method of detecting and resolving a SA transmission collision.

FIG. 3 illustrates an exemplary method for detecting collisions between SA transmissions of two terminal devices, the terminal device 100A and 100B. For simplicity, FIG. 3 illustrates only two terminal devices. It should be understood that there may be more than two terminal devices and that the methods and techniques disclosed herein, for example, shown in all figures, are applicable to a D2D communication system comprising two or more terminal devices. In FIG. 3, before the terminal device 100A transmits its initial SA, it first attempts to receive SA transmissions from other terminal devices and detects an empty time slot when no SA transmission is received. The terminal device 100A selects the transmitting window within which the empty time slot belongs and starts SA transmissions using the next transmitting opportunity or time slot in this initially selected transmitting window.

However, after the initial selection of a transmitting window, it is possible that two or more terminal devices, e.g., the terminal device 100A and 100B, may choose the same transmitting window and start SA transmissions in the same time slots. As a result, the SA transmissions from the two terminal devices 100A and 100B collide, as shown in Step 1 in FIG. 3. Due to the half-duplex constraint, each of the two terminal devices 100A and 100B cannot receive the SA transmission from the other terminal and cannot detect the collision between their SA transmissions. In some embodiments, to help detecting SA transmission collisions, one of the terminal devices, e.g., the terminal device 100A, may be configured to select randomly some transmitting opportunities from its transmitting window. During the randomly selected transmitting opportunities, the terminal device 100A does not transmit any SA. The terminal device 100A mutes its SA transmission to listen for SA transmissions from other terminal devices (Step 2 in FIG. 3). The terminal device 100A attempts to receive SA transmissions from other terminal devices. If SA transmissions from other terminal devices, e.g., the terminal device 100B, are detected, the terminal device 100A determines that there is a collision between itself and the terminal device 100B, and takes action to resolve the collision. For example, the terminal device 100A may select a different transmitting window to avoid collision (Step 3 in FIG. 3). In some embodiments, the terminal device 100A may continue listening for SA transmissions from other terminal devices until it finds an empty time slot during which no SA transmission is detected. The transmitting window to which the detected empty time slot belongs is selected by the terminal device 100A for SA transmission. After selecting a different transmitting window, the terminal device 100A starts its SA transmission again (Step 4 in FIG. 3).

In the above description, only two terminal devices are mentioned. In some embodiments, there may be more than two terminal devices and a terminal device may be in collision with more than one terminal device. For example, when the terminal device 100A mutes its SA transmission and tries to detect SA transmissions from other terminal devices, the terminal device 100A may receive SA transmissions from two different terminal devices. In a manner similar to what is described in FIG. 3, the terminal device 100A determines that there is a collision with another terminal device. However, the terminal device 100A may be unaware that it is in a collision with multiple devices. The terminal device 100A may proceed to resolve the collision in the same approach as described in FIG. 3. Please note that the same is true with all other figures. Although only two terminal devices are depicted in each figure, the methods and techniques described therein are applicable to scenarios in which more than two terminal devices are involved in a collision.

In FIG. 3, the terminal device 100A randomly selects one or more transmission opportunities to mute its own SA transmissions and tries to listen to SA transmissions from other terminal devices in order to detect SA transmission collisions.

Figure 4:
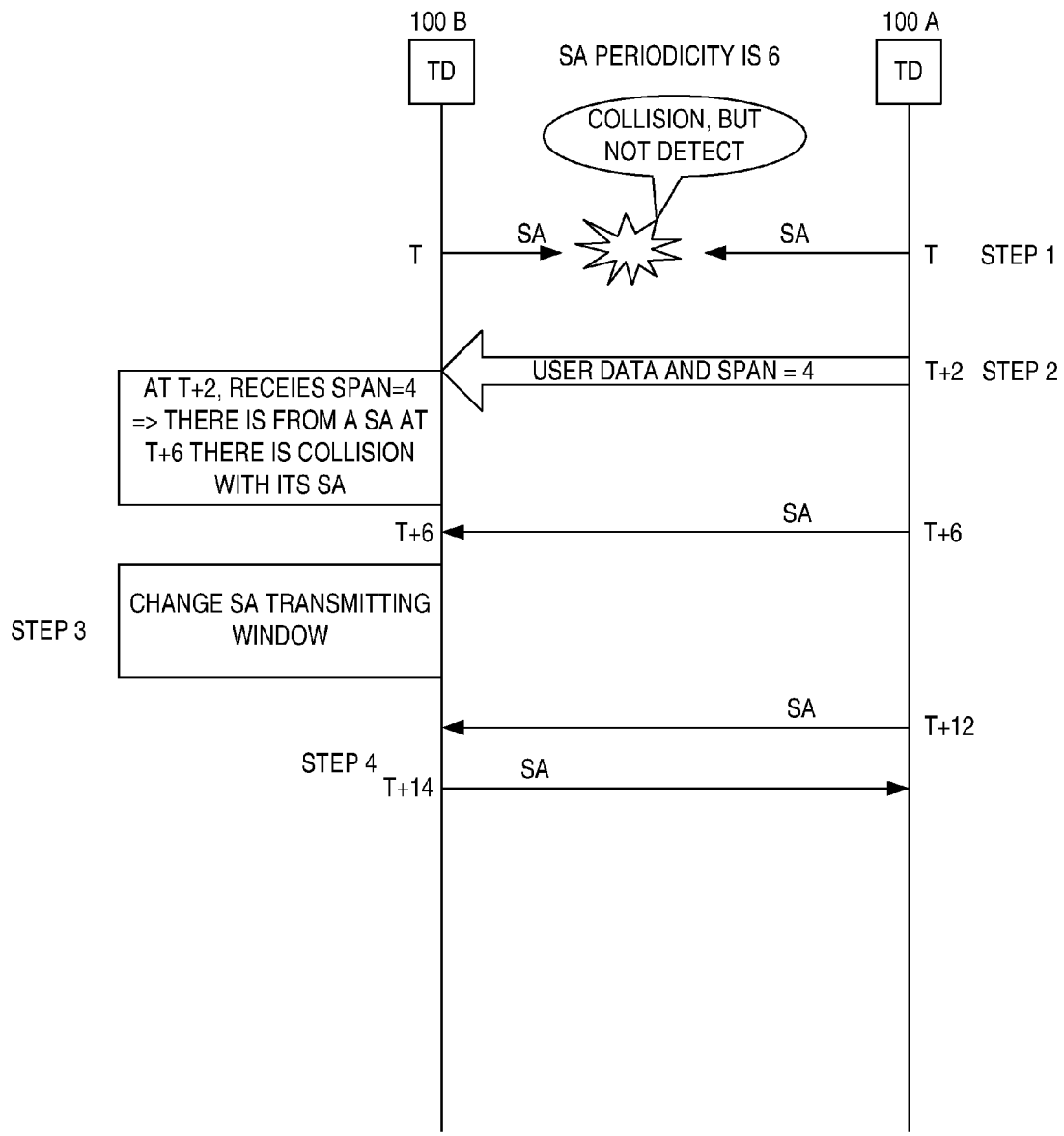
FIG. 4 illustrates a second exemplary method of detecting and resolving a SA transmission collision.

In another embodiment, the terminal device 100A can be configured to detect SA transmission collisions by attaching timing information about its future SA transmissions to its user data transmission. For example, among all user data transmissions, the terminal device 100A selects some or all data transmission to include the time interval between the selected data transmission and its next SA transmission. Once a terminal device, e.g., the terminal device 100B, receives the user data from the terminal device 100A, the terminal device 100B extracts the information of time interval between the time when the user data is received and the time when the next SA is to be transmitted from the received user data. The terminal device 100B calculates when the next SA transmission from the terminal device 100A will be, and determines whether there will be a collision with its own SA transmission. FIG. 4 illustrates an exemplary procedure for this embodiment.

In FIG. 4, a D2D network comprises two terminal devices 100A and 100B. The terminal device 100A is assigned a higher priority than the terminal device 100B. In Step 1 of FIG. 4, two terminal devices 100A and 100B are transmitting, e.g., broadcasting, SAs in the same transmitting opportunity at time T, thus causing a collision. The collision between the terminal devices 100A and 100B cannot be detected by either device.

In Step 2 of FIG. 4, the terminal device 100A, at time T+2 time slots (or 2 transmitting opportunities), transmits user data along with the information indicating that there will be a SA transmission from the terminal device 100A after a time span of 4 time slots (or 4 transmission opportunities). The terminal device 100B receives the user data transmitted at time T+2 by the terminal device 100A, and extracts, from the received user data, the information indicating that there will be a SA transmission from the terminal device 100A at time T+6 (T+2 plus the time span of 4 time slots). The terminal device 100B determines that the next SA transmission from the terminal device 100B will collide with its own SA transmission. In Step 3 of FIG. 4, the terminal device 100A transmits an SA at time T+6 and during a next transmission opportunity in the same transmission window, i.e., at time T+12. The terminal device 100B, after determining that there is a SA transmission collision with the terminal device 100A, chooses a different SA transmitting window. For example, the terminal device 100B may choose to transmit an SA at T+14 (Step 4 in FIG. 4). As a result, the collision between SA transmissions of the terminal device 100A and the terminal device 100B is resolved.

As described above, when the SA transmissions of two terminal devices are in a collision, one of the terminal devices may be configured to reselect its transmission window to avoid collision. In FIG. 4, it is the terminal device 100B that selects another SA transmitting window to resolve the detected collision. As a comparison, in FIG. 3, it is the terminal device 100A that reselects a transmitting window to resolve a detected collision.

In some embodiments, a priority based scheme is used to decide which terminal device reselects the transmitting window for SA transmissions. When using a priority based scheme, if a current terminal device has a higher priority than its collision competitor, the current terminal device does not change its transmitting window. If a current terminal has an equal or lower priority than its collision competitor, the current terminal device stops using its current transmitting window to transmit SAs. The current terminal may start detecting SA transmissions from other terminal devices until finding an empty time slot during which no SA transmission is detected. The current terminal device selects the transmitting window within which the empty time slot belongs for SA transmissions, and starts SA transmissions in the next transmitting opportunity in the selected transmitting window.

In some embodiments, to enable the priority based scheme, the priority associated with each terminal device may be embedded in the D2D user data transmitted by each terminal device. A priority may be assigned to an entire terminal device, in which case all services running on the terminal device have the same priority. When a terminal device receives user data from another terminal device, it can retrieve, from the received user data, the priority information related to the transmitter.

In some embodiments of the priority based scheme, a priority can be assigned to individual services. Different services may be assigned different priorities. In some embodiments, a priority assigned to a terminal device may be derived from the D2D service currently being executed on the terminal device. In some embodiments, a terminal device may maintain or store the priority information received from other terminal devices. In some embodiments, only the latest priority information, i.e. the priority information from the most recently received user data, will be maintained. When a terminal device 100A detects a SA transmission collision with another terminal device, the terminal device 100A may retrieve the priority information of the collision competitor that has been maintained by the terminal device 100. In some embodiments, if the terminal device 100A cannot find the priority information of the collision competitor, the terminal device 100A may assume that the collision competitor has the highest priority. In some embodiments, the terminal device 100A may assume that the collision competitor has a default priority.

Figure 5:
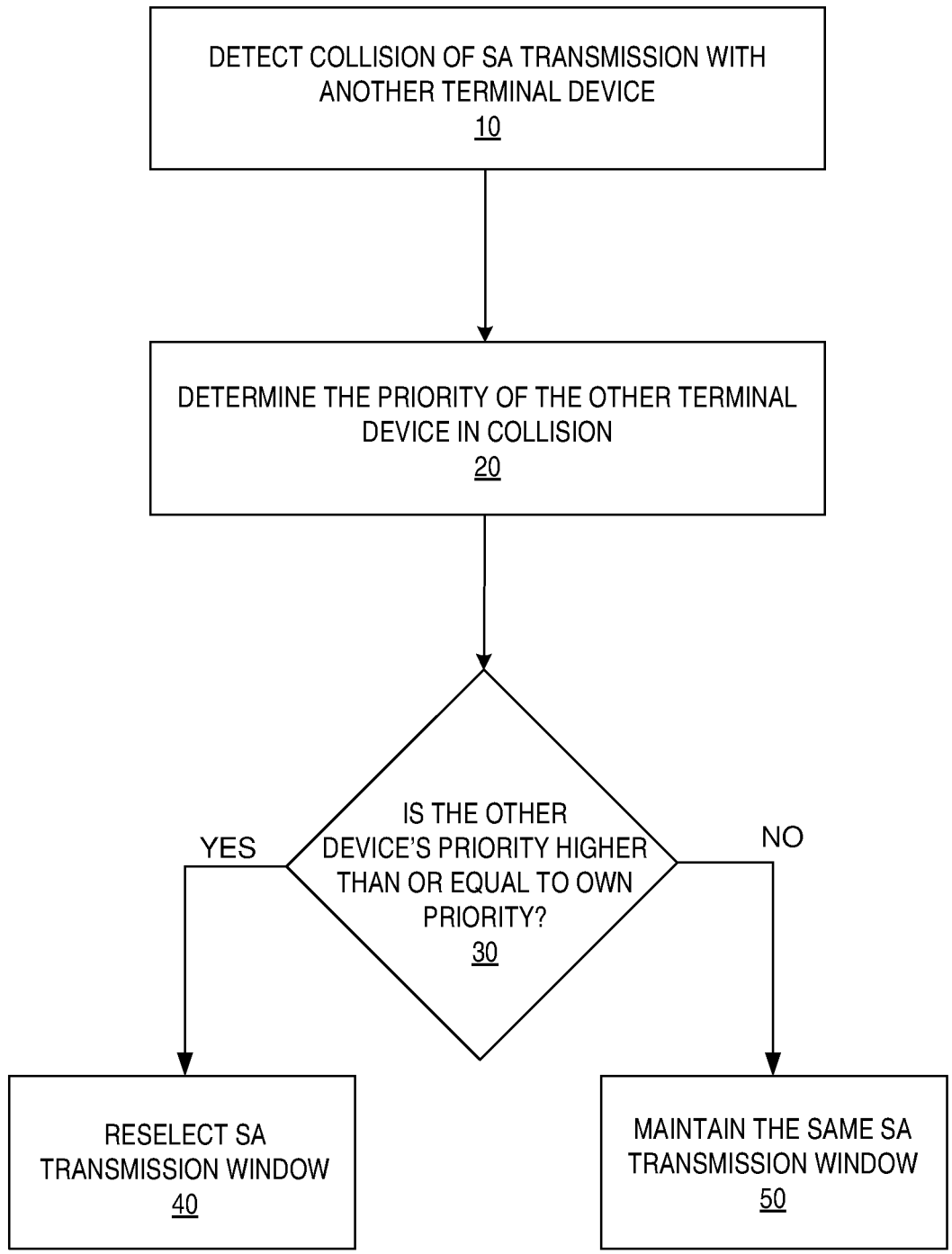
FIG. 5 is a flow chart illustrating an exemplary method of resolving SA transmission collisions.

FIG. 5 is a flow chart illustrating an exemplary collision resolution procedure. In FIG. 5, a terminal device 100A detects a SA transmission collision with another terminal device 100B (step 10). The terminal device 100A determines the priority of the other terminal device 100B (step 20) and compares the other terminal device's priority with its own priority (step 30). If the other terminal device's priority is higher than or equals to its own priority, the terminal device 100A reselects a SA transmission window (step 40). If the other terminal device's priority is lower than its own priority, the terminal device 100A maintains the same transmission window (step 50).

Figure 6:
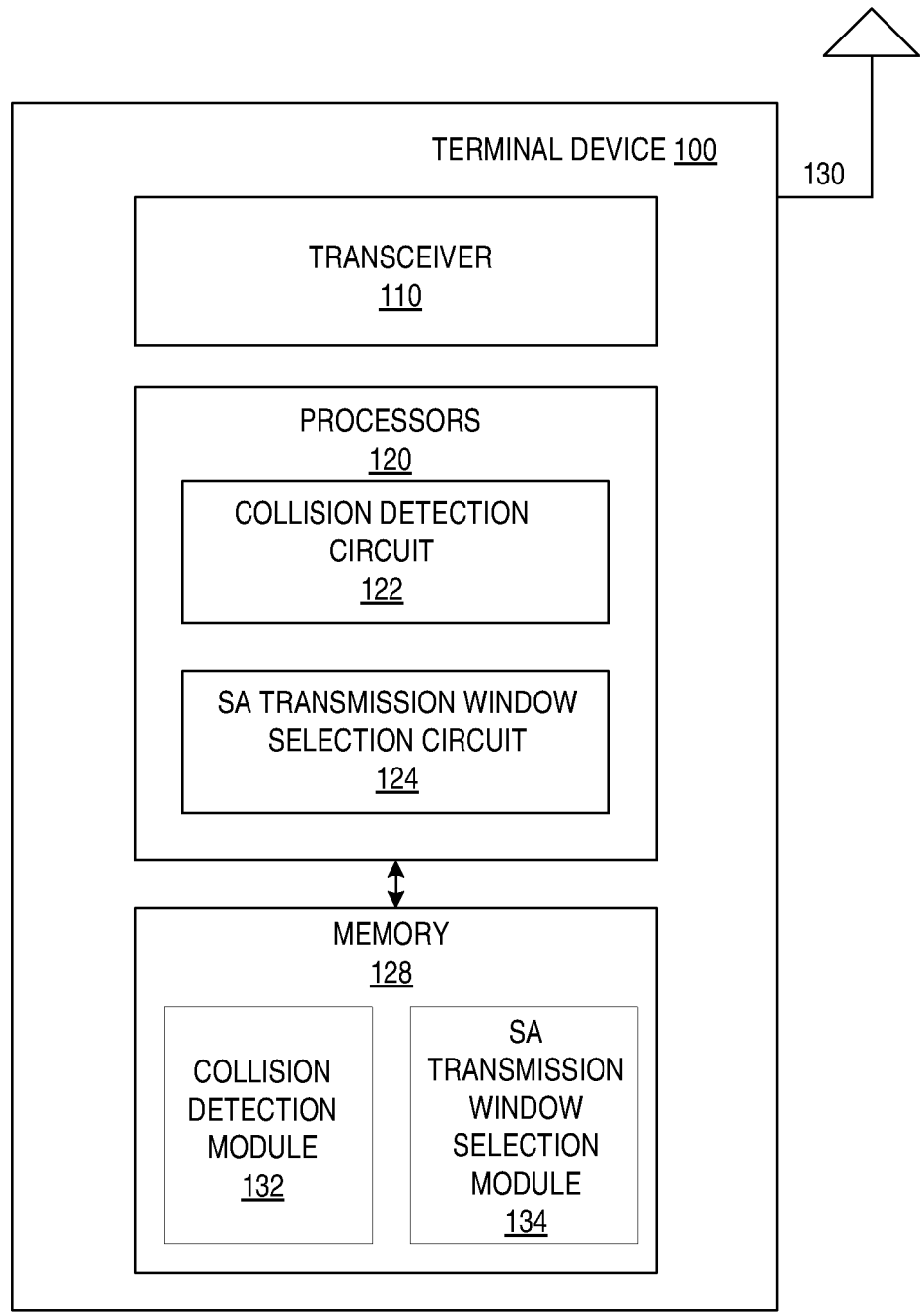
FIG. 6 is a block diagram illustrating an exemplary terminal device configured for detecting and resolving SA transmission collisions.

FIG. 6 illustrates an exemplary terminal device that is configured for collision detection and resolution. The exemplary terminal device 100 comprises an antenna 130, a transceiver 110, a memory 128, and one or more processors 120. The antenna 130 and the transceiver 110 are configured to transmit and receive signals to and from other terminal devices such as the terminal device 100B. The memory 128 stores data or information required by the one or more processors 120. For example, the memory 128 may store the priority of the terminal device 100 and the priorities of other terminal devices. The memory may also store a software program that, when executed, can cause the processors 120 to perform the methods described herein. The software program may comprise a collision detection module 132 and a SA transmission window selection module 134. The collision detect module 132, when executed by the processors may cause the processors 120 to detect SA transmission collisions with other terminal devices. The SA transmission selection module 134, when executed by the processors, may cause the processors 120 to select or reselect a transmission window for the terminal device 100 to transmit SAs.

The one or more processors 120 may comprise a collision detection circuit 122 and a SA transmission window selection circuit 124. The collision detection circuit 122 is configured to detect SA transmission collisions with other terminal devices. The transmission window selection circuit 124 is configured to select or reselect a transmission window for the terminal device 100 to transmit SAs.

The exemplary terminal device in FIG. 6 is configured to perform the methods described herein. The collision detection circuit 122 may be configured to detect SA transmission collisions with other terminal devices by randomly selecting one or more transmission opportunities and muting SA transmissions during the randomly selected one or more transmission opportunities. During the muted transmission opportunities, the terminal device 100 can listen to SA transmissions from other terminal devices, and determine that there is a collision if the terminal device 100 receives SA transmissions from other terminal devices while muting. In some embodiments, the terminal device 100 may attach to the user data the timing information of its next SA transmission. The collision detection circuit 122 may be configured to detect SA transmission collisions by comparing the received timing information with its own SA transmission window or transmission opportunities. Once the terminal device 100 detects that there is collision with another terminal device, the terminal device 100 may retrieve its priority and the priority of the other terminal device from the memory 128. The terminal device 100 compares its priority with that of the other terminal device. If the terminal device 100 has a higher priority than the other terminal device, the terminal device 100 keeps its own transmission window or opportunities. If the terminal device 100 has a priority lower than or equal to that of the terminal device 100B, the transmission window selection circuit 124 is configured to select another transmission window.

Figure 7:
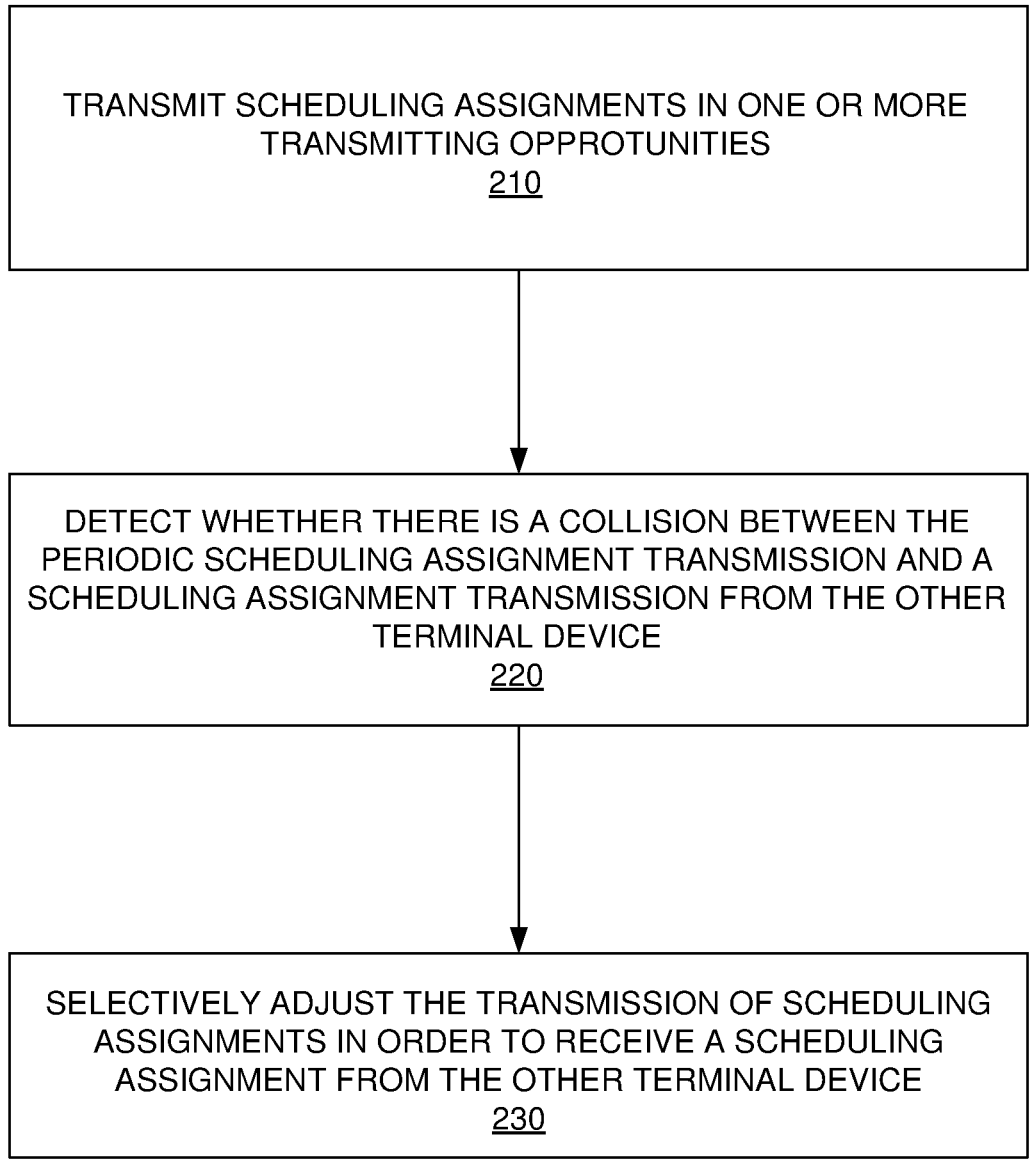
FIG. 7 is a flow chart illustrating an exemplary method of detecting and resolving SA transmission collisions.

FIG. 7 illustrates a flow chart of an exemplary SA transmission collision detection and resolution method. As shown in step 210 of FIG. 7, a terminal device 100 transmits scheduling assignments in one or more transmitting opportunities. In step 220, the terminal device 100 detects whether there is a collision between the periodic scheduling assignment transmission and a scheduling assignment transmission from the other terminal device. In step 230, the terminal device 230 selectively adjusts the transmission of scheduling assignments in order to receive a scheduling assignment from the other terminal device.

According to some embodiments, in step 210 of FIG. 7, a terminal device 100 transmits SAs periodically. The SA indicates one or more time slots scheduled for the terminal device 100 to transmit user data. The terminal device 100 detects whether there is a collision between the periodic SA transmissions and a SA transmission form one or more other terminal devices, such as the terminal device 100B (step 220 of FIG. 7). When there is a collision, the terminal device 100 selectively adjusts the periodic SA transmissions in order to receive SAs from the terminal device 100B (step 230). The terminal device 100 transmits user data based on the scheduling information in the transmitted SA. The terminal device 100 also receives user data from the other terminal device based on the received SA.

The methods and techniques disclosed in the present application may be carried out in other specific ways than those herein set forth without departing from the scope and essential characteristics of the subject matter described herein. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

What is claimed is:

1. A method implemented in a terminal device for device-to-device communication with another terminal device, comprising:
   transmitting scheduling assignments in one or more transmitting opportunities;
   detecting whether there is a collision between the transmission of scheduling assignments and a scheduling assignment transmission from the other terminal device; and
   selectively adjusting the transmission of scheduling assignments in order to receive a scheduling assignment from the other terminal device, based on comparing a priority of the terminal device with a priority of the other terminal device, and adjusting the transmission of scheduling assignments only if the priority of the terminal device is lower than or equal to the priority of the other terminal device.

2. The method of claim 1, wherein the transmission of scheduling assignments in one or more transmitting opportunities comprises transmitting the scheduling assignments during a transmitting window, the transmitting window comprising a set of transmitting opportunities with a pre-determined periodicity.

3. The method of claim 2, wherein the adjusting of the transmission of scheduling assignments comprises transmitting the scheduling assignments during a different transmitting window that has the same pre-determined periodicity.

4. The method of claim 1, wherein detecting whether there is a collision between the transmission of scheduling assignments and the scheduling assignment transmission from the other terminal device comprises:
   randomly selecting a transmitting opportunity in the one or more transmitting opportunities to mute the transmission of scheduling assignments by the terminal device to allow the terminal device to receive signals; and
   determining that there is a collision when the terminal device receives a scheduling assignment from the other terminal device during muting.

5. The method of claim 1, wherein detecting whether there is a collision between the transmission of scheduling assignments and the scheduling assignment transmission from the other terminal device comprises:
   receiving a user data transmission from the other terminal device, said user data transmission comprising an indication of when a scheduling assignment will be transmitted by the other terminal device; and
   determining that there is a collision by comparing when a scheduling assignment will be transmitted by the other terminal device with the one or more transmitting opportunities.

6. The method of claim 1, wherein the priority of the terminal device is a priority assigned to the terminal device.

7. The method of claim 1, wherein the priority of the terminal device is a priority assigned to an application running on the terminal device.

8. A terminal device configured for device-to-device communication with another terminal device, the terminal device comprising:
   a transceiver configured to transmit scheduling assignments in one or more transmitting opportunities; and
   a processor configured to:
      detect whether there is a collision between the transmission of scheduling assignments by the terminal device and a scheduling assignment transmission from the other terminal device; and
      selectively adjust the transmission of scheduling assignments in order to receive a scheduling assignment from the other terminal device, based on comparing a priority of the terminal device with a priority of the other terminal device, and adjusting the transmission of scheduling assignments only if the priority of the terminal device is lower than or equal to the priority of the other terminal device.

9. The terminal device of claim 8, wherein the transceiver is further configured to transmit the scheduling assignments during a transmitting window, the transmitting window comprising a set of transmitting opportunities with a pre-determined periodicity.

10. The terminal device of claim 9, wherein the processor is configured to adjust the transmission of scheduling assignments by transmitting the scheduling assignment during a different transmitting window that has the same pre-determined periodicity.

11. The terminal device of claim 8, wherein the processor is configured to detect whether there is a collision between the transmission of scheduling assignments and the scheduling assignment transmission from the other terminal device by:
   randomly muting the transmission of scheduling assignments by the terminal device to allow the terminal device to receive signals; and
   determining that there is a collision when the terminal device receives a scheduling assignment from the other terminal device.

12. The terminal device of claim 8, wherein the processor is configured to detect whether there is a collision between the transmission of scheduling assignments and the scheduling assignment transmission from the other terminal device by:
   receiving a user data transmission from the other terminal device, said user data transmission comprising an indication of when a scheduling assignment will be transmitted by the other terminal device; and
   determining that there is a collision by comparing when a scheduling assignment will be transmitted by the other terminal device with the one or more transmitting opportunities.

13. The terminal device of claim 8, wherein the priority of the terminal device is a priority assigned to the terminal device.

14. The terminal device of claim 8, wherein the priority of the terminal device is a priority assigned to an application running on the terminal device.

15. A non-transitory computer-readable medium, storing a computer program comprising instructions that, when executed by a processing circuit of a terminal device configured for device-to-device communication with another terminal device, configures the terminal device to:
- transmit scheduling assignments in one or more transmitting opportunities;
- detect whether there is a collision between the transmission of scheduling assignments and a scheduling assignment transmission from the other terminal device; and
- selectively adjust the transmission of scheduling assignments in order to receive a scheduling assignment from the other terminal device, based on comparing a priority of the terminal device with a priority of the other terminal device, and adjusting the transmission of scheduling assignments only if the priority of the terminal device is lower than or equal to the priority of the other terminal device.

\* \* \* \* \*